United States Patent [19]
Bosworth et al.

[11] 3,748,432
[45] July 24, 1973

[54] APPARATUS FOR WELDING CORRUGATED MATERIALS BY PLASMA ELECTRON BEAM WELDING SYSTEM

[75] Inventors: Thomas J. Bosworth; Lowell L. Jackson, both of Seattle, Wash.

[73] Assignee: The Boeing Company, Seattle, Wash.

[22] Filed: Dec. 27, 1971

[21] Appl. No.: 212,296

[52] U.S. Cl. .................... 219/121 EB, 219/117 HD
[51] Int. Cl. ............................................. B23k 15/00
[58] Field of Search ............... 219/121 EM, 121 EB, 219/117 R, 117 HD, 137; 250/49.5 TE; 29/45 F

[56] References Cited
UNITED STATES PATENTS

| | | | |
|---|---|---|---|
| 3,301,993 | 1/1967 | Boyd et al.................. | 219/121 EB X |
| 3,626,142 | 12/1971 | King.............................. | 219/121 EB |
| 3,475,583 | 10/1969 | Gerlach ........................ | 219/121 EB |
| 3,136,883 | 7/1964 | Radtke........................... | 219/121 EB |
| 3,185,815 | 5/1965 | Anderson....................... | 219/137 |
| 3,136,882 | 6/1964 | Radtke........................... | 219/117 R |
| 3,435,185 | 3/1969 | Gerard........................... | 219/121 EM |
| 3,219,792 | 11/1965 | Pederson....................... | 219/117 R |
| 2,883,544 | 4/1959 | Robinson........................ | 250/49.5 |

Primary Examiner—J. V. Truhe
Assistant Examiner—Gale R. Peterson
Attorney—Kenneth W. Thomas et al.

[57] ABSTRACT

A method and apparatus for achieving electron beam or plasma electron beam welding of corrugated panels utilizing a particular vacuum chamber arrangement that encompasses only a small portion of the workpieces. This chamber is formed by the part being welded and a relatively soft rubber belt molded to fit the contour of the corrugations and formed of two interlocking havles. The interlocked lips of the belt and the configuration of the shell portion of the welding chamber is such that the belt seal opens and closes allowing passage of the welding head along its length while maintaining the vacuum seal.

In one concept, the belt functions as a clamp-on chamber held on the parts by frictional force, while in a second concept, an endless seal belt integral with the welding unit is used to form a traveling chamber which "walks" along the panel surface.

12 Claims, 7 Drawing Figures

PATENTED JUL 24 1973 3,748,432

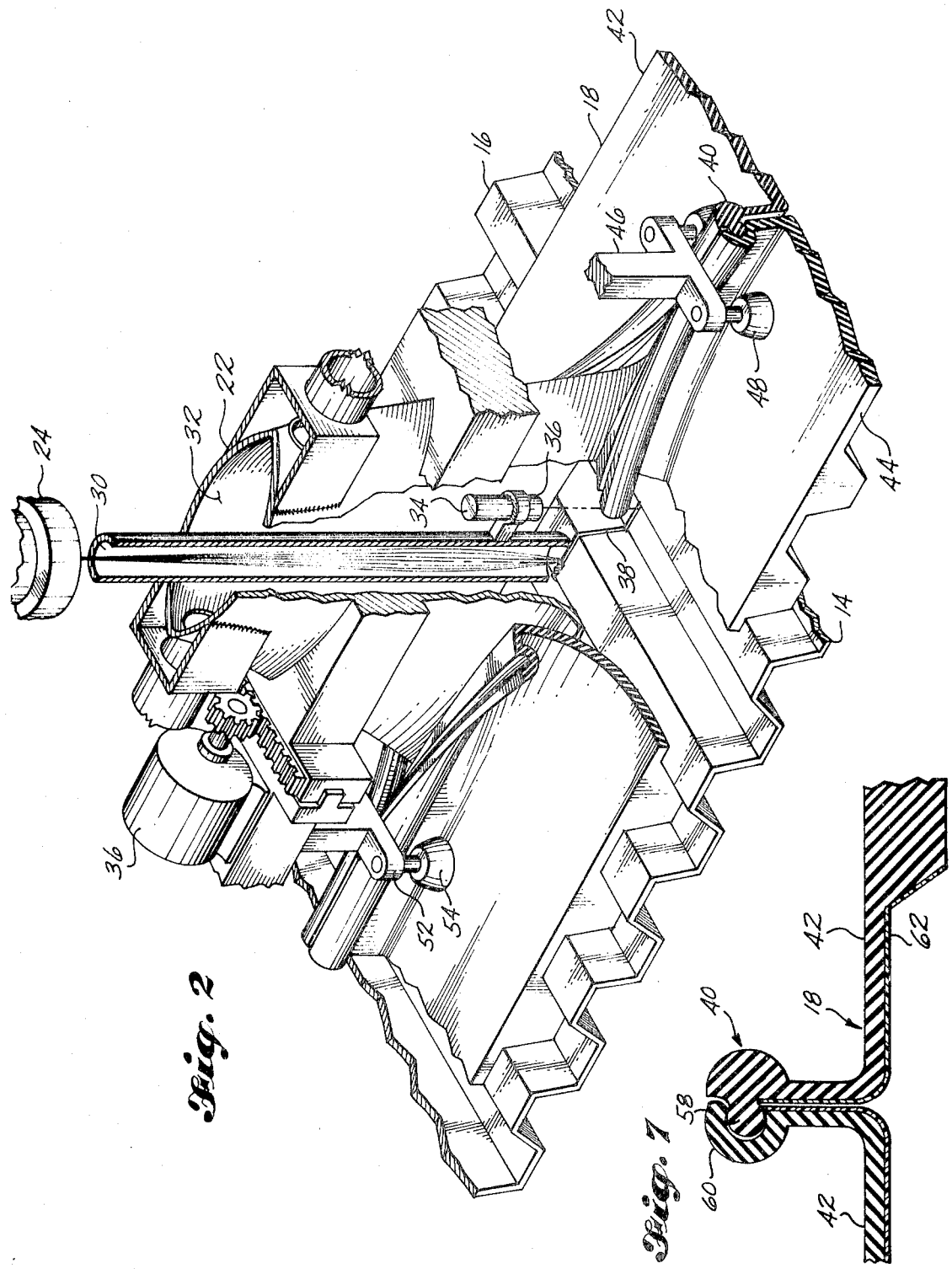

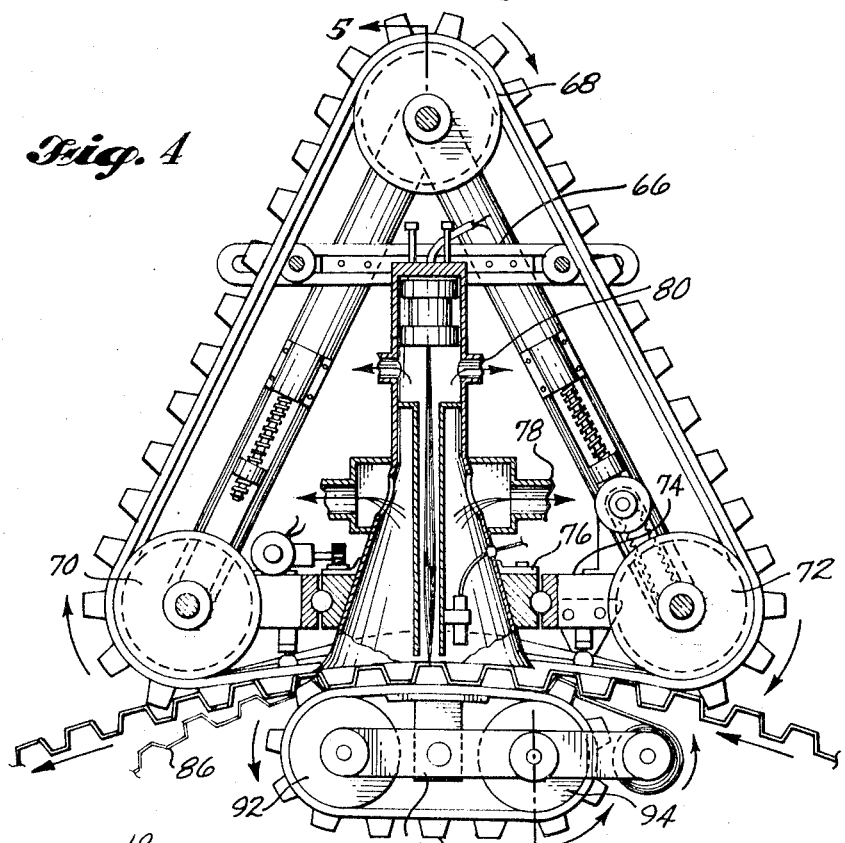
Fig. 4
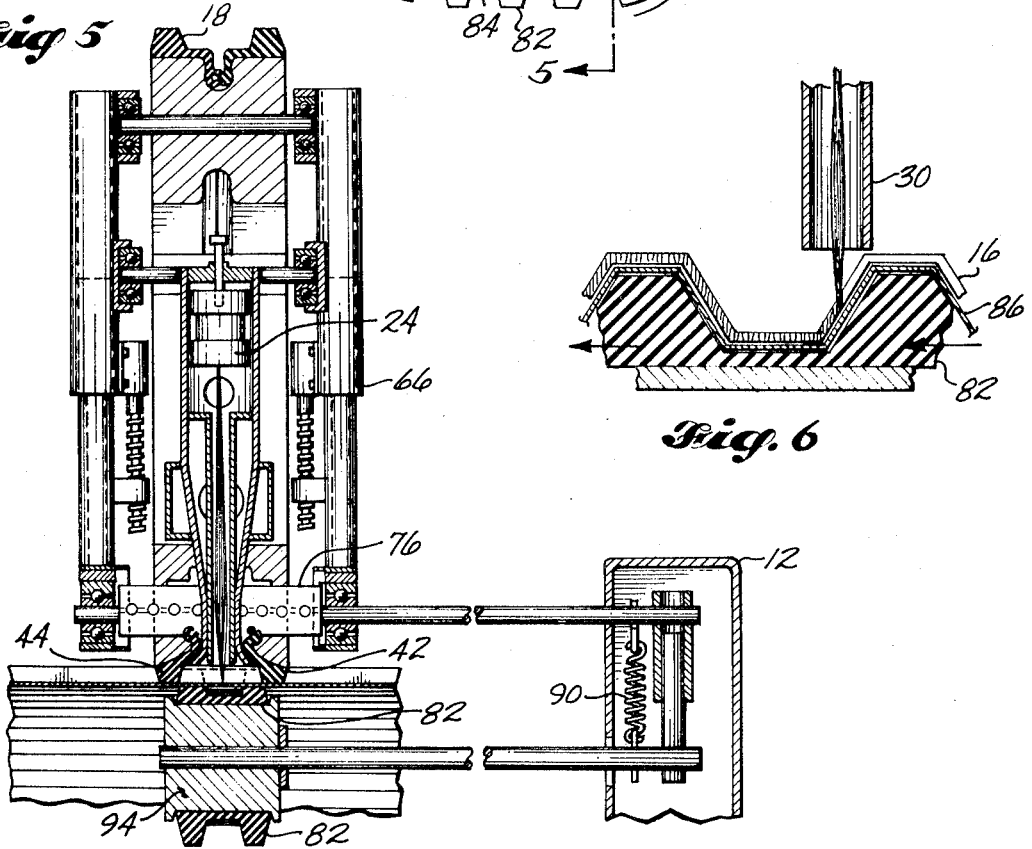
Fig. 5
Fig. 6

3,748,432

APPARATUS FOR WELDING CORRUGATED MATERIALS BY PLASMA ELECTRON BEAM WELDING SYSTEM

FIELD OF THE INVENTION

This invention relates to an apparatus for welding corrugated material by an electron beam or plasma electron beam welding device in a substantially vacuumized environment.

The system also incorporates other necessary adjuncts to the welding system, most of which are fairly conventional in nature although they are modified somewhat to accommodate the particular configuration of the workpieces. Such features include, for example, adhesive band underseam sealing, endless belt seam backing means and feeding means for metal foil filler or backup, lead plate radiation protection, seam tracking means and the concept of focusing the beam at the elevation mid point of the corrugations.

A novelty search and art investigation showed the existence of the following patent references as being of interest:

| | |
| --- | --- |
| 3,264,004 | SCIAKY |
| 3,401,249 | SCHLEICH et al. |
| 3,469,065 | SCHLEICH et al. |
| 3,475,583 | GERLACH |

The investigation did not develop any references relating to the use of electron beam welding to join corrugated panels, or more particularly, to the concept of utilizing an interlocking two-piece soft rubber belt as a sealing and vacuum chamber forming means, not to the two-stage, roughing and final vacuum arrangements incorporated in the welding unit.

Thus, the above references are merely of general interest and teach some of the more conventional arrangements for providing a vacuum chamber only over a relative small portion of the workpieces rather than having to provide for a very large vacuum chamber in which the entire workpiece assembly is placed. These teachings are of both fixed and movable vacuum arrangements with the two patents to SCHLEICH providing the only noted showing of the use of traveling corrugated belts, which in this case are utilized to both convey the workpieces and to form the vacuum chamber by cooperating with those workpieces.

SUMMARY OF THE INVENTION

As a result of design studies related to the Space Shuttle program and other aerospace programs requiring thin-walled pressure vessels, it was determined that a corrugated wall design would have certain advantages over other configurations for flight weight, thin-walled pressure vessels. From a structural aspect, the corrugated design has come distinct benefits, but from the manufacturing standpoint it has some serious drawbacks, the main one being the economical forming of the corrugated panels in a manner such that they can be readily welded circumferentially. Several concepts have been devised for fabricating these panels so that they can be joined with gas tungsten arc welding equipment; however, these will be costly, both from the equipment and manufacturing standpoints. With conventional gas tungsten arc welding (GTAW) equipment it would be necessary to either (1) form the ends of the panels so that there is no corrugation at the weld joint area, or (2) develop an extensive control system that will constantly change torch position, speed, attitude, etc., and follow the contour continuously.

In recent years a welding device called the plasma electron beam welder has been developed which is characterized by two unique features: (1) it has a long (30 inch) gun to work distance; and (2) it operates in a soft vacuum (approximately 100 microns). These two features make it attractive for welding corrugated structures. The first feature (long gun to workpiece distance) will permit the beam to be focused at the midpoint of the corrugations. For a corrugation height of 1.5 inches, the variation in gun-to-work distance is only ±5 percent, a variation that could be readily compensated for with minimum control equipment. The second feature (soft vacuum operation) permits welding in either a conventional vacuum chamber or, for very large or long structures, with a clamp-on or traveling chamber.

The present invention is primarily concerned with the welding of large corrugated thin-walled pressure vessels using plasma electron beam welding equipment. However, it is readily apparent that this concept is applicable to other structures or welding methods that, for high efficiency, must operate in a reduced atmosphere, such as electron beam welding devices, or for welding reactive metals in an inert atmosphere.

Two concepts are presented; however, in principle they are identical. The main feature in common comprises a vacuum chamber formed by the part being welded and a relatively soft rubber belt that is molded to fit the contour of the part. The rubber belt is composed of two halves that interlock, forming a vacuum-tight seal. The seal is designed to be opened and closed allowing passage of the welding head along its length. The configuration of the shell portion of the welding chamber is such that as it passes through the rubber belt a vacuum seal is maintained.

The first concept encompasses the belt as a clamp-on chamber held on the part by frictional force. The welding head is track or boom mounted and either the workpiece or the welding torch may move. The rubber belt provides a continuous chamber about the parts being welded that can be evacuated and/or backfilled with inert gases as dictated by the requirements of the welding equipment.

The second concept uitlizes the belt as a traveling chamber in the form of an endless belt which is integral to the welding unit. The welding unit can be stationary or mobile, depending on the size and shape of the part being welded.

In both cases, sensors are used to keep the welding beam aligned with the seam being welded and only a relatively small volume is being evacuated. In the first concept, evacuation of the entire enclosed area may be accomplished prior to welding whereas in the second concept, evacuation occurs simultaneously with welding. The outer shell of the welding head is designed to begin evacuation ahead of the torch or beam; the distance being determined by such factors as the welding speed, part contour, operating atmosphere or degree of vacuum. As explained hereinafter, the invention utilizes a welding head which has at least two chambers under evacuation. An inner chamber surrounds the beam and is maintained at a high vacuum. The inner chamber and welding gun are designed to act independently of the outer chamber so that the beam angle may be altered as necessary. An outer chamber is connected to high efficiency pump means and is used to reduce the pressure of the welding zone to a low level.

On the side opposing the wleding head, several tasks are accomplished by either of several methods which are known prior art systems. For instance, a narrow foil strip of the same material as being welded is fed between the traveling backup and the workpiece, and formed to the contour of the part. This serves as a backing strip into which the weld beam either partially or totally penetrates. The traveling backup serves to fit the metal foil to the part and to provide a vacuum seal opposite the welding head. Where a traveling backup cannot be used, the corrugated, or otherwise formed foil strip may be held in place by a tape made of mylar or some other material. The tape would also serve as a vacuum seal.

Where a traveling backup is used, radiation shielding could be accomplished by a lead plate or lead-lined enclosure. If a traveling backup is not used, x-ray shielding might be accomplished by lead-backed tape.

It is therefore an object of the present invention to provide for welding equipment used in conjunction with a welding system requiring a vacuumized environment and which incorporates a clamp-on or traveling vacuum chamber means for assuring a controlled atmosphere.

It is an additional object of the present invention to provide for a vacuumized system incorporating means that permits welding in an inert atmosphere and/or at reduced pressures. Accordingly, plasma electron beam, gas tungsten arc, or electron beam welding systems can be utilized.

It is a general object of the present invention to provide for a clamp-on or traveling chamber means complementing a contour of an associated part to be welded and having a sealing means which continuously is being broken and resealed for the passing along of a welding gun.

It is a further object of the present invention to provide for a means for use with conventional plasma electron beam, electron beam or other welding systems, which incorporates an inner vacuum system protected by an outer vacuum system that has a continuous seal opening and closing feature for passing through of welding essentials while maintaining an unaltered atmosphere in the inner vacuum system.

In general, the present invention relates to an apparatus which incorporates a plasma beam welding means for welding corrugated panels to one another at a controlled atmosphere, and which comprises a chamber means having an open end, and a plasma welding means for producing a welding beam directed towards the open end. The chamber means is adapted to be disposed with its open end on the to-be-welded corrugated panels for forming an enclosed chamber therewith. Certain means are connected to the chamber for vacuumizing the chamber to a predetermined vacuum level, while sealing means are employed for maintaining the chamber at a predetermined vacuum level. The sealing means are of resilient material comprising two parts each having means to interlock with one another and a base surface which is disposed on and complements with the associated corrugated panel corrugations. Furthermore, there are means for disconnecting the interlocking means in front of the chamber and means for connecting the interlocking means aft of the chamber whereby upon translational movement between the chamber and the panels the sealing means provides for a minimum of leakage between the enclosed chamber and associated outside atmosphere so that said plasma welding of the panels under required vacuum environment can be accomplished.

Other objects and advantages of the present invention will become apparent from the following description when taken in conjunction with the accompanying drawings.

THE DRAWINGS

FIG. 2 is a perspective, partly cut-away, view of the welding apparatus chamber and sealing means when a welding operation is in process.

FIG. 4 shows a side elevation of the apparatus illustrated in FIG. 1.

FIG. 5 is a section of the apparatus taken along line 5—5 of FIG. 4.

FIG. 6 is a detailed vertical section showing the welding beam in relationship to the corrugations.

FIG. 7 is a sectional view of the preferred interlocking system for the two-piece sealing means.

DESCRIPTION AND OPERATION OF THE INVENTION

Figure 1:
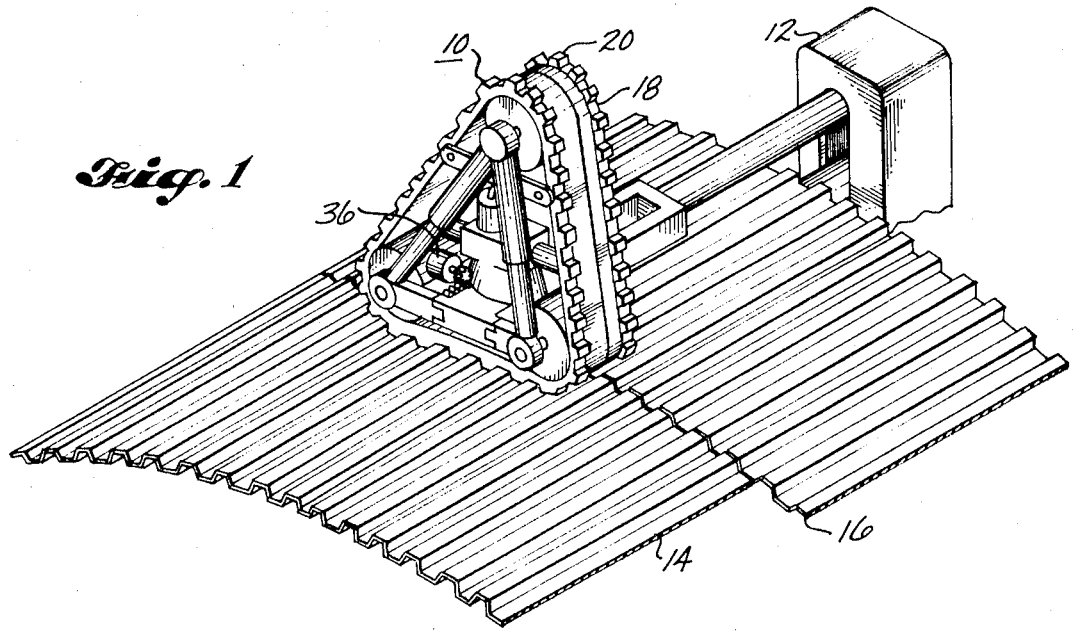
FIG. 1 is a perspective view of the preferred embodiment of the welding apparatus in operation.
Figure 3:
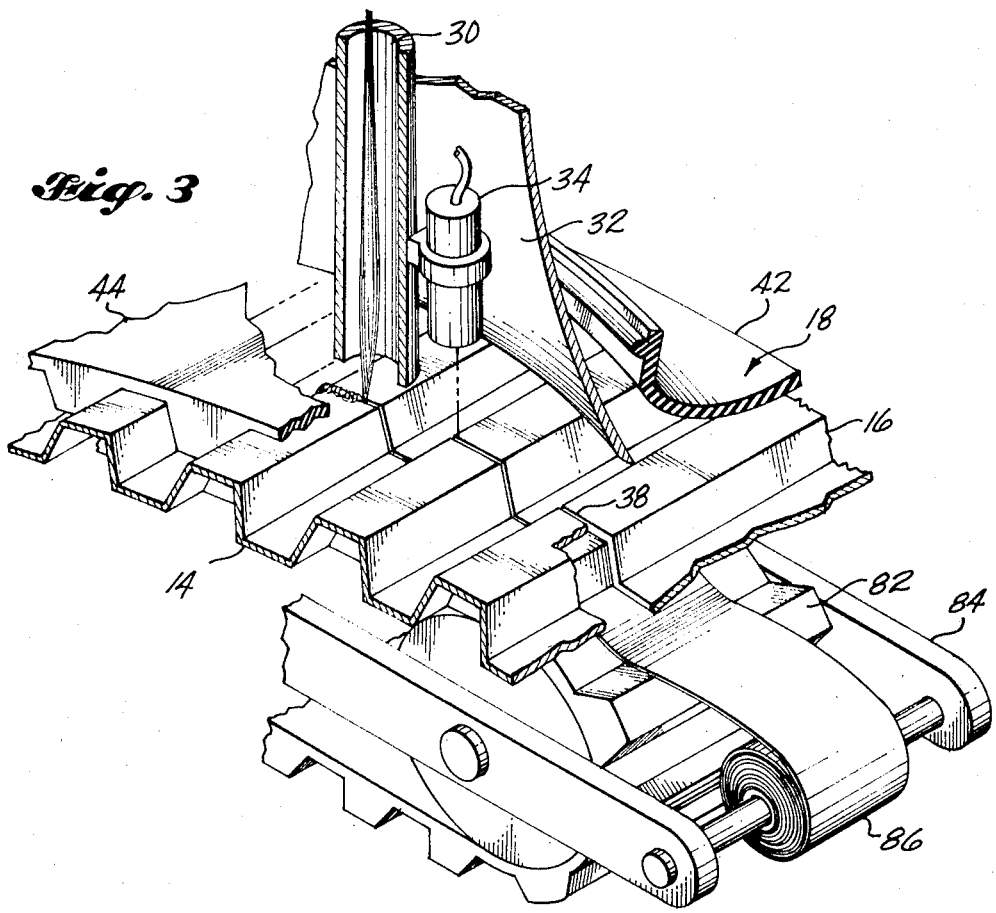
FIG. 3 is a perspective, partly-cut-away, view of the welding apparatus and an optional supporting and sealing means.

Referring now to the drawings wherein like a reference characters designate like or corresponding parts throughout the several views, there is shown in FIG. 1 a welding apparatus 10 connected to associated support or driving means 12. The welding apparatus 10 is traveling over a pair of corrugated panels 14 and 16 disposed in side-by-side aligned position. A two-part endless sealing belt 18 with complementing portions 20 that fit with the corrugations of the corrugated panels 14 and 16 is rotationally supported by the welding apparatus 10. The endless sealing belt 18 provides for a sealing between the ocrrugated panels' upper surfaces and the interior of a structure defining a chamber 22. This structure or dome-shaped chamber means 22 supports the plasma welding gun 24. The chamber 22 comprises a high vacuum inner chamber 30 and a low vacuum outer chamber 32.

As shown in FIG. 2, the high vacuum inner chamber 30 has mounted thereon a self-aligning sensing means 34 which is electrically connected to a motor means 36 which upon signals of the self-sensing aligning means 34 continuously tends to align the center of the high vacuum inner chamber 30 with the slit 38 existing between the two corrugated panels 14 and 16. The endless sealing belt 18 is made from two parts which are connected by an interconnecting means 40. The right side portion 42 and the left side portion 44 of the sealing belt 18 are kept together by a holding mechanism 46 employing two rollers 48. The forward exterior shape of the chamber 22 has a pointed surface adjacent said holding means and serves as a means that separates the sealing belt 18 into the right and left side portions 42 and 44. This separation goes together with the unlocking of a snap-type interlocking or interconnecting means 40. As illustrated in FIG. 2, the chamber 22 has an exterior with a smooth streamline type of structure that guides the sealing belt portions in abutting relationship about the chamber 22 and toward each other by its aft pointed exterior surface. A second holding mechanism or locking means 52 provided with rollers 54 locks together the right and left side portions of the seal 42 to 44 respectively, located aft of the chamber 22, into the original assembled sealing belt 18.

For a preferred embodiment of the interconnecting means 40, special attention is directed to FIG. 7 which shows a cross-section of the sealing belt 18 and shows that the right-hand portion is provided with a round bulb portion 58 that snaps into a receptacle or concave portion 60 in the left-side portion of the seal 44. The material of the seal is of a rubber-type resiliency and is preferably provided with a harder and stiffer surface 62. Of course, this surface 62 is an optional improvement.

As discussed before, the plasma electron beam welding system is specially and particularly important and beneficial in the welding of corrugated materials, such as the panels illustrated. Because, as explained, the focus point of the beam of this welding gun maintains a constant heat intensity over a substantially long portion, thus the mid-point of the beam, at the average height line of the corrugations will suffice for efficiently welding this type of structure. In other words, it is not necessary to vary the beam's focus point in accordance with the variations in panel curvature. During operation of the welding apparatus, the average focusing of the electronic beam is at the approximate height shown in FIG. 6.

In the illustration shown in FIGS. 4 and 5, more details have been shown as to the structural and mechanical components that are involved in an endless belt type of apparatus. It should however be understood that a non-continuous or a certain length two-part seal with similar zipper or interlocking means disposed over a certain distance of corrugated panels would be workable and would create the same vacuum result as by the apparatus shown in its preferred embodiment using endless type of belt means as in FIGS. 1, 4 and 5.

It should be understood also that the apparatus could be positioned in a permanent location, and the corrugated panels could be moved inbetween the belts, or the apparatus would be moved over the corrugated panels which of course will produce the same result.

Referring now to FIG. 4, the preferred embodiment uses a frame 66 that has rotationally mounted thereon in a triangular, spaced-apart arrangement three track wheels 68, 70 and 72. The base portion 74 of the frame 66 has a rotationally mounted platform 76 that carries the chamber 22. Conduct means 78 and 80 are provided to the chamber 22 for vacuumizing the outer chamber 32 and the inner chamber 30. In order to keep the separation between the two corrugated panels as leakproof as possible, a second continuous, resilient type of material, supporting sealing means or sealing belt 82 having complementing corrugated panel features, is rotationally mounted on the carriage means 84. The carriage means 84 has a wheel 92 and a wheel 94 and is positioned just underneath the chamber 22. The arrangement of the belt 18 and the belt 82 are such that a predetermined clamping force is applied to the corrugated panels from both sides so that a sealing efficiency is obtained and furthermore it would be preferred that a heat sink metal foil-type 86 of backup is used so that the resilient material of the belt 82 is not being damaged by the heat intensity caused by the electrobeam gun. As shown in FIG. 5, the necessary clamping force between the two belts is provided by a spring 90.

Although a particular embodiment of the invention has been illustrated and described, it will be obvious to those skilled in the art that various changes and modifications may be made without departing from the invention, and it is intended to cover in the appended claims all such changes and modifications that come within the spirit and scope of the invention.

We claim:

1. An apparatus which incorporates an electron beam or plasma electron beam welding means for welding corrugated panels or the like edge-to-edge in a controlled atmosphere, comprising:
   a. means defining a chamber having an open end and carrying said welding means for producing a welding beam directed toward said open end;
   b. means for disposing the open end of said chamber means on one side of said to-be-welded edge-to-edge corrugated panels for forming an elongated chamber therewith;
   c. means for effecting a partial vacuum within said enclosed chamber;
   d. sealing means for maintaining the partial vacuum within said chamber;
   e. said sealing means being resilient material comprising two parallel strips extending past said chamber means in engagement with opposite sides thereof;
   f. said strips having inner edges in interlocking engagement with each other in front of and behind said chamber means.
   g. the base surfaces of the strips being corrugated to fit against said one side of the panels by conforming to their corrugations; and
   h. means for disconnecting said interlocked edges in front of said chamber and means for reconnecting said edges behind said chamber, whereby upon translational movement between said chamber means and said panels said sealing means provide for a minimum of leakage between said enclosed chamber and outside atmosphere so that the welding together of said panels can be accomplished in a predetermined vacuum environment.

2. An apparatus as claimed in claim 1, wherein said sealing strips are endless belts disposed side by side, said apparatus including rotatable means supporting said belts.

3. An apparatus as claimed in claim 1, wherein said interlocking inner edges of said strips extend away from the side of the strips opposite to said base surfaces.

4. An apparatus as claimed in claim 1, including means close to the front of said chamber means holding the interlocked edges of said strips together, said disconnecting means being formed by a forwardly tapered portion of said chamber means that separates said edges directly behind said holding means.

5. An apparatus as claimed in claim 4, wherein said reconnecting means include means close to the back of said chamber means for guiding said inner edges of said strips into interlocking relationship, the back of said chamber means having a rearwardly tapered portion adjacent said guiding means.

6. An apparatus as claimed in claim 1, including means opposed to said chamber means open end for engaging the other side of said panels for supporting them and sealing said other side from said enclosed chamber, said supporting means being corrugated to fit against said other side of the panels.

7. An apparatus as claimed in claim 6, including spring means for urging said sealing means and said supporting means toward each other, whereby to press them against said panels.

8. An apparatus as claimed in claim 6, including a strip of metal foil adapted to be pressed against said panels by said supporting means to serve as a heat sink and backup for the weld.

9. An apparatus as claimed in claim 1 wherein said chamber means has a centrally located means defining a second chamber and wherein said second chamber has a second means for effecting a vacuum that is higher than said partial vacuum and wherein said second chamber means has an open end directed towards said panels to be welded.

10. An apparatus as claimed in claim 9 wherein said welding means electron beam travels towards said panels within said second chamber.

11. An apparatus as claimed in claim 10 wherein said welding apparatus is provided with automatic beam-weld aligning means and with weld area sensing means for controlling said automatic beam-weld aligning means.

12. An apparatus which incorporates an electron beam or plasma electron beam welding means for welding corrugated panels or the like to one another in a controlled atmosphere, comprising:
   a. a frame carrying means defining a first chamber of dome type bottomless configuration;
   b. means defining a second chamber centrally located within said first chamber and having an open end, said second chamber means carrying said associated electron beam welding means for producing a welding beam directed toward said open end;
   c. said first and second chamber means adapted to be disposed with said open end on said to-be-welded corrugated panels for forming an enclosed chamber therewith;
   d. first means for effecting a partial vacuum within said first chamber means and second means for effecting a partial vacuum within said second chamber means;
   e. sealing means for maintaining the partial vacuum within said first and second chamber means, said sealing means being of resilient material comprising an endless first belt of two endless parts having means to interlock with one another and a base surface which is disposed on and complements with said associated corrugated panel corrugations;
   f. means for disconnecting said interlocking means in front of said first chamber and means for connecting said interlocking means aft of said first chamber;
   g. means for moving said welding apparatus over said to-be-welded panels whereby said sealing means endless first belt travels over said panels and provides for a minimum of leakage between said enclosed chamber means;
   h. second endless belt support/sealing means arranged on a carriage positioned under said panels, and
   i. spring type clamping means provided between said carriage and said frame means for producing sealtight arrangement between said panels and said first and second chamber means.

* * * * *